United States Patent Office 2,942,896
Patented June 28, 1960

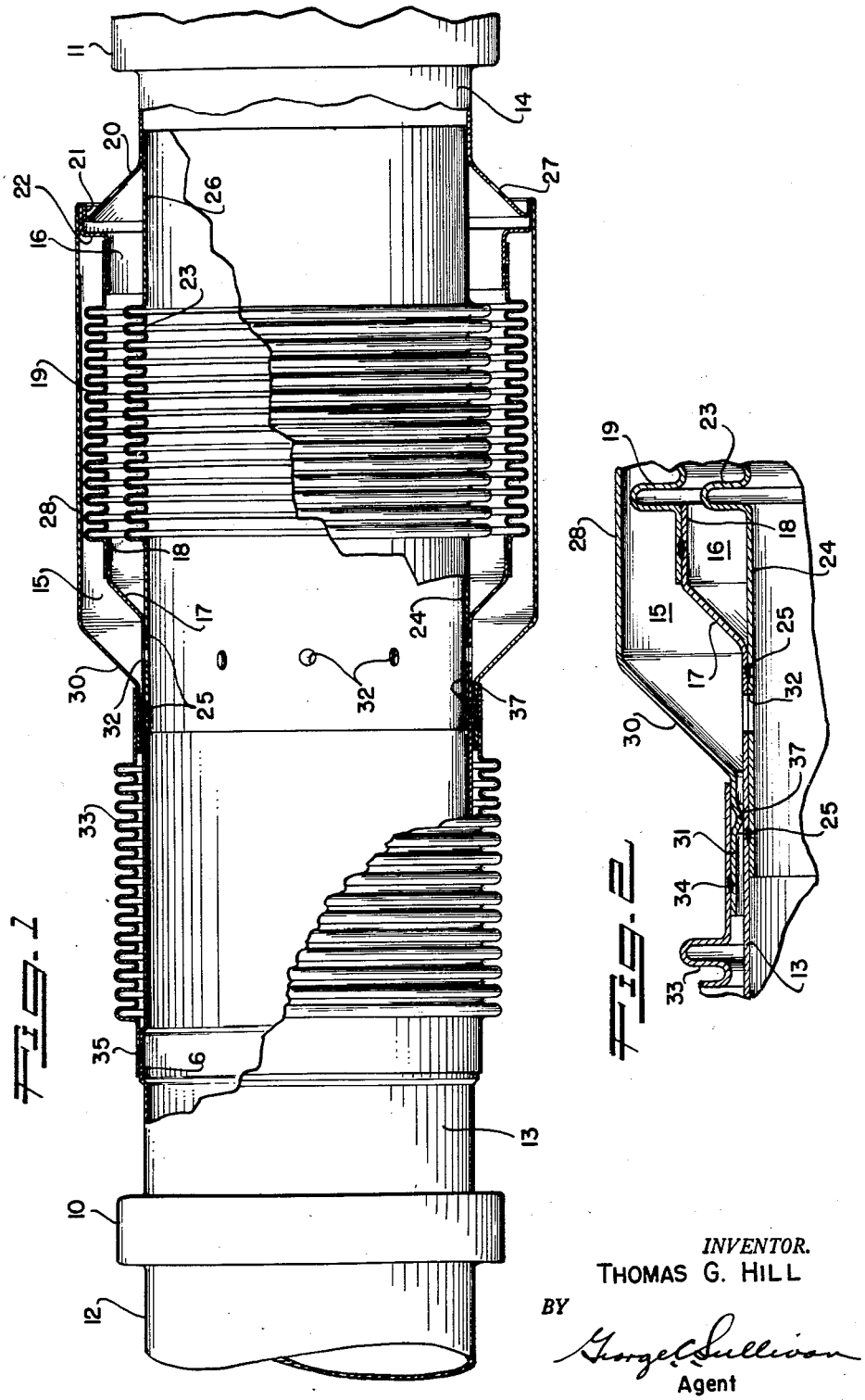
June 28, 1960   T. G. HILL   2,942,896
FLEXIBLE DUCTING COMPENSATOR
Filed June 7, 1954
INVENTOR.
THOMAS G. HILL
BY
George C. Sullivan
Agent

2,942,896

FLEXIBLE DUCTING COMPENSATOR

Thomas G. Hill, Atlanta, Ga., assignor to Lockheed Aircraft Corporation, Burbank, Calif.

Filed June 7, 1954, Ser. No. 434,985

1 Claim. (Cl. 285—228)

This invention relates to flexible duct systems and relates more particularly to compensator means useful in ducts handling fluids at high temperatures and high pressures.

In aircraft having turbo propulsive engines, it is becoming a common practice to bleed compressed air from the compressors of the engines for use in various systems and devices of the airplane. The compressed air thus bled from the engines is under high pressure and at a high temperature, for example at 650° F. or higher. Great difficulty has been encountered in providing duct systems capable of handing this high pressure, high temperature air. The high pressure of the air and the necessity for absorbing thermal expansion imposes axial forces on the ducting, the duct fittings, couplings, etc. resulting in column action tending to buckle, distort and detach the ducting. Structural angular deflections further complicate the installations and add to the buckling and distortion of the ducting. In order to absorb thermal expansion and angular deflections it is the practice in some installations to insert simple bellows in the duct system or to provide loops in the flexible ducting so as to provide flexible regions for absorbing the deflection and thermal expansion. Neither of these expedients are altogether successful. Accordingly, in many instances it has been necessary to also provide an excessively large number of brackets, supporting arms, etc. in order to restrain the ducting and hold it against excessive buckling and possible failure. These heavy supporting devices impose severe weight penalties on the airplane.

It is a general object of this invention to provide a simple, practical and dependable compensating device adapted to be interposed in high pressure, high temperature flexible ducting to avoid or overcome the difficulties heretofore encountered in such installations.

Another object of the invention is to provide a pressure compensator for duct systems of the character referred to that serves to absorb structural deflections and thermal expansion of the ducting and at the same time to induce and maintain tension forces in the ducting system to counteract or prevent the development of column action in the ducting. The device utilizes reliable bellows for absorbing the flexure and thermal expansion and contraction and employs the pressure of the compressed air itself to apply or exert axial tensile forces on the system to counteract the tendency for the air under pressure therein to impose a compressing or column action that would otherwise produce column failure of the ducting.

Another object of the invention is to provide a flexible ducting compensator of the class referred to that does not in any way obstruct or interfere with the flow of the fluid in the system or reduce the effective diameter of the ducting.

A further object of the invention is to provide a flexible ducting compensator of this kind that is light in weight and that has a relatively small maximum external diameter so as to be readily incorporated in a ducting system.

A still further object of my invention is to provide a ducting compensator of the character referred to that does not necessitate the use of pistons, packing, or other instrumentalities that require servicing or that are adversely affected by the high temperatures encountered.

Other objectives and features of the invention will become apparent from the following detailed description of a typical preferred embodiment illustrated in the accompanying drawings in which:

Figure 1 is a longitudinal detailed sectional view of a ducting compensator of the invention with the end portions appearing in side elevation; and Figure 2 is an enlarged fragmentary, longitudinal sectional view of a portion of the compensator.

In the drawings I have shown the device of the invention connected or arranged between two spaced joints or couplings 10 and 11 of a duct system 12 for handling fluid at high pressure and high temperatures, for example a duct system of the kind used to handle compressed air bled from the compressor of a turbo jet or turbo propeller aircraft engine. The invention is not primarily concerned with the couplings 10 and 11 and the details of these devices are omitted from the drawings. A tube 13 extends from the coupling 10 and a tube 14 extends from the coupling 11, the two tubes being substantially axially aligned and extending toward one another. The compensator comprises an arrangement and combination of tubes or sleeves and flexible bellows which not only constitute a fluid conductor connecting the tubes 13 and 14 but also define a super atmospheric pressure chamber 15 and an atmospheric pressure chamber 16.

The sleeve or tube 13 is of substantial length and is provided with a region 6 of slightly enlarged diameter some distance from the coupling 10 and is provided at its end most remote from the coupling 10 with a flared portion 17 terminating in a cylindrical tubular part 18. A tubular bellows 19 is seam welded on this enlarged cylindrical part 18 and extends axially therefrom toward the coupling 11. As will later become apparent the flared portion 17 and the bellows 19 constitute a partition or wall between the two chambers 15 and 16. The sleeve or tube 14 extending from the coupling 11 has a flared portion 20 terminating in a turned-back cylindrical flange 21 of increased diameter. A flanged sleeve 22 is seam welded to the plain end portion of the bellows 19 and is welded on this flange 21. Thus the flexible and expansible and contractable bellows 19 is connected between the tube 13 and the tube 14.

An inner tubular bellows 23 is spaced within and arranged generally concentric with the bellows 19 to constitute the inner annular wall of the atmospheric pressure chamber 16. The bellows 23 has a plain cylindrical or tubular end portion 24 seam welded to the internal surface of the sleeve or tube 13 at two axially spaced seam welds 25, located adjacent the flared portion 17. The other plain end portion 26 of the bellows 23 is seam welded to the interior of the tube or sleeve 14 adjacent its flared portion 20. Thus the flexible, extensible and contractable bellows 23 also serves to connect the sleeves or tubes 13 and 14. It should be observed that the bellows 23, which is thin-walled and, therefore, of substantially the same effective diameter as the tubes 13 and 14, serves to conduct the stream of air, or other fluid from one tube to the other with a minimum of interference and practically no restriction.

Circumferentially spaced ports 27 in the flared portion 20 of the tube 14 place the chamber 16 in communication with the atmosphere.

An outer tubular sleeve or shell 28 is arranged in spaced surrounding relation to the outer bellows 19. One end of this shell 28 is welded to the collar 22 and flange 21, it being preferred to employ a continuous annular fuse weld to join these three parts. The other end of the shell 28 has a wall portion 20 sloping inwardly toward the sleeve or tube 13 and terminating in a cylindrical end part 31 which is spaced around the tube 13. From an inspection of the drawings it will be seen that the wall 30 of the shell 28 is spaced axially from the sloping or flaring portion 17 of the tube 13 and is generally parallel therewith. The shell 28 and its wall portion 30 constitute the outer wall of the super atmospheric pressure chamber 15. A series of spaced ports 32 in the wall of the tube 13 and plain section of the inner bellows 23, places the chamber 15 in communication with the interior of the duct system so that the pressure in the chamber 15 is substantially equal to the pressure of the fluid in the duct.

The shell 28 is connected with the tube 13 through the medium of a tubular bellows 33. The bellows 33 is spaced closely around the tube 13. One plain end portion of the bellows 33 is secured to the end part 31 of the shell 28 at a continuous annular seam weld 34. The other plain end portion of the bellows 33 is secured to the above described raised region 6 of the tube 13 by a similar seam weld 35. As best shown in Figure 2, the end part 31 of the shell 28 has an internal annular bead 37 presenting a rounded or convex surface which bears or rides on the external surface of the tube 13 to stabilize and support the connected bellows 33 and shell 28. This bead 37 is free to have relative movement on the tube 13 during expansion, contraction and flexure of the compensator.

The materials of which the device is constructed and the proportions of its parts and components will, of course, depend upon the intended use or application of the device. In the present case it will be assumed that the device is to be used in the compressor-air-bleed system of an airplane in which event it will be preferred to construct the device and various elements of the duct system of stainless steel. The device is operable to absorb the axial expansion resulting from the thermal differential between the aluminum structure of the aircraft at negative 65° F. and the stainless steel ducting system at a temperature of 700° F. assuming that the aircraft structure and the ducting are at a temperature of about 75° F. when the ducting system is installed in the airplane. The device may be constructed to allow a substantial angular deflection, for example a maximum angular deflection of about 6°, and is capable of handling the fluid or air at a high pressure and temperature. In practice, in an application such as just mentioned, the air may be handled at 120 pounds per square inch and at a temperature of between 500° F. and 700° F. It will be observed that the compensator constructed of relatively thin stainless steel, or the like, is light in weight and occupies a minimum of space.

In the use or operation of the device the two parallel arranged bellows 19 and 23 and the general construction and arrangement of parts allow for substantial angular relative deflection between the spaced parts or couplings 10 and 11 of the duct system. The bellows 19, 23 and 33 also absorb considerable relative axial movement between the tubes 13 and 14, which movement may result from thermal expansion and contraction and other causes. Thus the device or compensator is fully flexible in that it permits both relative angular movement and relative axial movement between the duct sections or tubes 13 and 14. Furthermore, the device operates to impose or introduce an axially directed tension between the tubes 13 and 14 to compensate for or counteract the oppositely directed axially compressive or column force produced by the air under pressure within the duct system. As above described, the ports 27 place the chamber 16 in communication with the atmosphere while the ports 32 place the annular chamber 15 in communication with the interior of the duct. Thus there is atmospheric pressure acting on one side of the wall portion 17 and the super atmospheric pressure of the duct acting on the other side of this wall portion. Similarly there is atmospheric pressure acting on the outer side of the annular wall portion 30 of the shell 28 and the super atmospheric duct pressure acting on the other side of this wall portion 30. The pressure in the chamber 15, acting on the wall portion 17, and opposed only by the atmospheric pressure in the chamber 16, exerts an axial force or tensile force on the wall portion 17 and tube 13 tending to move the tube and its coupling 10 toward the coupling 11. In the same manner the super atmospheric pressure in the chamber 15 acts on the inner side of the wall portion 30 to exert an axial force on the shell 28 which tends to move the shell and the section 14 toward the coupling 10. In practice the pressure wall portions 17 and 30, which are both annular or circular, may readily be proportioned so that the pressure differentials across them will completely balance or counteract, or more than balance or counteract, the action of the internal pressure in the duct system tending to apply the compressive force or column force to the duct system. The flexible pressure compensating device of the invention will, by reason of the action just described, maintain tension forces in the ducting system regardless of the intensity of the pressure being handled in the system to avoid the column action in the ducts. This in turn greatly reduces the number of supports required for the ducting, permits the use of lighter supports, and eliminates the possibility of column failure of the ducting.

Having described only a typical preferred embodiment of my invention I do not wish to be limited to the specific details herein set forth, but wish to reserve to myself any variations or modifications that may appear to those skilled in the art and fall within the scope of the following claim.

I claim:

A flexible pressure compensating device for connecting the ends of two spaced parts of a duct carrying fluid under pressure comprising: an inner and an outer flexible tubular metal bellows member each capable of angular flexure, axial extension and contraction longitudinally relative to the duct parts; said inner and outer bellows members coextensively spaced apart radially to form an axially extending first annular space therebetween; said inner bellows member sealingly interconnected at each end thereof to one of the duct parts for forming an unobstructed fluid passage between the duct parts of substantially the same diameter as the duct parts; a first and second wall extending generally radially relative to the longitudinal axis of the duct sealingly interconnecting each end of said outer bellows member with one of the duct parts ends; said walls closing the annular space between the inner and outer bellows members to form a first chamber; a first port means in the first of said walls placing said first chamber in communication with the ambient atmosphere around the duct; a shell around the outer bellows member and spaced radially therefrom; a third wall extending generally radially inward from the end of the shell adjacent said second wall toward the longitudinal axis of the duct and spaced from said second wall; means sealingly connecting the other end of the shell to the end of the outer bellows member connected to the first wall; means sealingly interconnecting the third wall with the outer surface of one of said duct parts thereby forming a second chamber with the second and third walls opposing surfaces of said second chamber; said interconnecting means between the third wall and duct part including an angular flexurable, axially extensible and contractible tubular metal bellows member surrounding and axially coextensive with a portion of said one of said duct parts; one end of the interconnecting bellows member sealingly secured to the third wall and the other end of the interconnecting bellows member sealingly secured around the outer surface of said one of said duct parts at a point sufficiently remote from the duct part end that the duct fluid flow through the axial length of the interconnecting bellows is radially confined within the duct part; an annular bead in conjunction with the end of the interconnecting bellows connected to the third wall slidably and rotatively supporting said interconnecting bellows about the duct part for longitudinal expansion and contraction thereof relative to the duct part; said annular bead permitting relative flexural displacement between said duct parts in any radial direction from the axes thereof; and second port means admitting fluid under pressure from the duct into the second chamber to act on the second and third walls to impose axial tension on said duct parts regardless of presence of any relative flexural displacement of said duct parts; all of said flexible pressure compensating device arranged radially relative to said duct parts to provide a duct of substantially constant area and diameter.

References Cited in the file of this patent

UNITED STATES PATENTS

| | | |
|---|---|---|
| 2,348,833 | Miller | May 16, 1944 |
| 2,614,887 | Shields | Oct. 21, 1952 |
| 2,766,997 | Hobart | Oct. 16, 1956 |

FOREIGN PATENTS

| | | |
|---|---|---|
| 543,925 | Germany | Feb. 11, 1932 |
| 543,928 | Germany | Feb. 11, 1932 |
| 258,088 | Switzerland | May 2, 1949 |
| 262,367 | Switzerland | Oct. 1, 1949 |
| 835,378 | Germany | Mar. 31, 1952 |